United States Patent [19]

Scott et al.

[11] Patent Number: 4,915,018

[45] Date of Patent: Apr. 10, 1990

[54] DIAPHRAGM PISTON ASSEMBLY

[75] Inventors: Daniel G. Scott, Swissvale; Theodore B. Hill, North Versailles, both of Pa.

[73] Assignee: American Standard Inc., Wilmerding, Pa.

[21] Appl. No.: 243,875

[22] Filed: Sep. 13, 1988

[51] Int. Cl.⁴ .......................... F01B 19/00; F16J 3/00
[52] U.S. Cl. .................................. 92/98 D; 92/96; 92/100
[58] Field of Search .................. 92/96, 98 R, 99, 102, 92/103 F, 103 SD, 105, 980, 130 R, 130 B, 135, 101, 103 R, 100

[56] References Cited

U.S. PATENT DOCUMENTS

| | | | |
|---|---|---|---|
| 1,964,745 | 7/1934 | Sauzedde | 92/102 |
| 2,371,632 | 3/1945 | Lippincott | 92/98 R |
| 2,742,785 | 4/1956 | St. Clair | 92/99 |
| 2,913,007 | 11/1959 | Morrison | 92/102 |
| 3,168,907 | 2/1965 | Mercier et al. | 92/98 R |
| 4,304,390 | 12/1981 | Kawabata et al. | 92/98 D |

FOREIGN PATENT DOCUMENTS 60869  10/1973  Australia ........................ 92/980

Primary Examiner—Robert E. Garrett
Assistant Examiner—Thomas Denion
Attorney, Agent, or Firm—G. J. Falce

[57] ABSTRACT

A diaphragm piston assembly in which an annular ring member is provided, preferably at the outer clamping periphery of the diaphragm between the underside of the diaphragm and body, to exert a force on the diaphragm in the direction of the cover that clamps the diaphragm to the body, thereby encouraging the diaphragm convolution to assume a disposition in a preferred direction corresponding to the direction in which the convolution is predisposed by the inherent "spring effect" of the diaphragm.

31 Claims, 4 Drawing Sheets

DIAPHRAGM PISTON ASSEMBLY

BACKGROUND OF THE INVENTION

The present invention relates, in general, to diaphragm pistons that operate in the cavity of a body in the manner of a piston and cylinder and, in particular, to such diaphragm piston arrangements in which the diaphragm exhibits an inherent "spring effect", which can be beneficial particularly when the diaphragm piston is employed to operate pneumatic valving and the like.

In railroad brake control applications, where it is common practice to employ high pneumatic pressures on the order of 100 psi., for example, a fabric-reinforced-type of diaphragm is necessary to withstand the high-pressure forces without diaphragm "balooning" and subsequent failure. These fabric-reinforced diaphragms tend to be stiffer than regular diaphragms and thus exhibit a substantially noticeable internal force or "spring effect". This so-called "spring effect" is an inherent force within the diaphragm itself that tends to exert a relatively light bias force on the diaphragm piston. This internal force is developed when the diaphragm is deflected from its molded-in configuration and typically acts in a direction to restore the diaphragm to its normal shape. In sensitive operating control valves, as in the well-known, industry standard, ABD type railroad brake control valve device, in which the service valve device 1 shown in FIGS. 1 and 2, is comprised of a diaphragm-type piston 2 that positions a slide valve (not shown) to achieve the desired brake control functions in response to variations in the brake pipe/auxiliary reservoir pressure relationship acting across the diaphragm piston, it is desirable to actuate the piston at very low pressure differentials in order to position the slide valve and achieve the resultant control function without delay. This is particularly desirable in actuating the piston from its release position, as shown in FIG. 2, to its application position, as shown in FIG. 1, and relies upon the diaphragm "spring effect" to help achieve this purpose.

Because of the relatively long service life required of diaphragms used in the above-mentioned application, conical-type diaphragms, as disclosed in U.S. Pat. No. 3,173,342 and incorporated herein by reference, are typically employed. The significantly long service life attributed to these conical-type diaphragms is achieved by maintaining the fabric material uniformly embedded in the rubber that comprises the diaphragm proper. This is possible since the normally flat fabric material is not required to assume an unnatural or convoluted shape during the molding process, as in bellows-type diaphragms, for example, and therefore does not tend to shift toward the surface of the rubber during the vulcanizing process. In realizing a long service life, however, due to the fabric material in conical-type diaphragms being unstressed during the vulcanizing process, these conical-type diaphragms also exhibit a relatively light "spring effect" for the same reason.

Consequently, the efficiency of the control valve device employing such conical-type diaphragms is compromised with respect to achieving fast brake response. Moreover, the convolution in these conical-type diaphragms has been found to take an inside-out set over a period of time, which further reduces the diaphragm "spring effect" and contributes to the decline in brake response.

It will be understood, for example, that during a brake release, a relatively high pressure differential is created across piston 2, thereby causing convolution 3 of diaphragm 4 to become inverted from its normal upwardly-directed disposition during movement of piston 3 from application position (FIG. 1) to release position (FIG. 2). Once movement of piston 2 to brake release position is complete and the pressures across piston 2 become substantially equalized, the inherent "spring effect" of diaphragm 4 is intended to gradually force the diaphragm convolution 3 to automatically unfold or revert back to its normal upward disposition, as shown in FIG. 2. Piston 2 is, therefore, in readiness for immediate actuation to application position in terms of the "spring effect" being in the desired direction to encourage movement of piston 2 toward application position. Also the volumetric displacement between the pressure chambers 6 and 7 on opposite sides of the diaphragm piston, due to transition of the diaphragm convolution, will have occurred prior to a subsequent reduction of brake pipe pressure to initiate a brake application.

In the event, however, the diaphragm convolution 3 does no revert back to its normal position following release of a brake application; and, since the piston normally remains in release position for a considerably long period of time between brake applications, the diaphragm convolution 3 tends to take a set in an inverse or downward disposition, as shown in FIG. 2. The result of this is that the initial upward-acting "spring effect" is lost and the set resists further diaphragm movement. Consequentially, a higher than normal pressure differential is required to actuate piston 2 when a brake application is subsequently initiated, thus increasing response time and adversely extending the time required to obtain braking.

Moreover, this requirement to obtain a higher than normal pressure differential to actuate piston 2 is aggravated by the fact that displacement of the diaphragm convolution also results in a volumetric exchange between chambers and 7 that tends to counteract development of the required pressure differential necessary to actuate piston 3, thereby further delaying piston response.

SUMMARY OF THE INVENTION

The object of the present invention is to provide a diaphragm piston arrangement in which the desired diaphragm "spring effect" is achieved by encouraging the diaphragm convolution to automatically toggle back from its inverted condition to its normal condition in release position of the diaphragm piston following equalization of the pressure differential thereacross.

Briefly, in accordance with the present invention, there is provided an annular ring in the vicinity of the diaphragm clamping bead, preferably associated with the body member, but also feasible with regard to the piston member or both. The annular ring may be formed integral with the diaphragm or may be a separate member. In either case, various configurations of the annular ring are envisioned. In all cases, the ring provides a support around which the diaphragm bends when the diaphragm convolution is inverted, the degree of bend being greater than without the ring. The greater the angle of this bend, the greater is the internal diaphragm force tending to return the diaphragm to its molded-in configuration, thereby increasing the "spring effect" the diaphragm exerts on its piston member.

BRIEF EXPLANATION OF THE DRAWINGS

The foregoing object and attendant advantages of the invention will be more readily apparent from the following detailed explanation of the invention, when taken in conjunction with the drawings in which.

DESCRIPTION AND OPERATION

Figure 3:
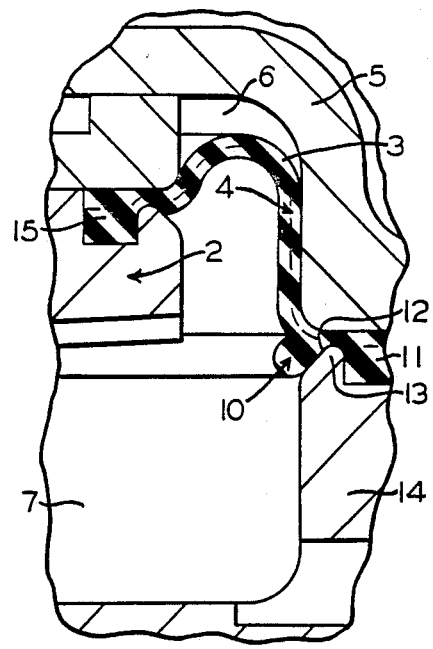
FIGS. 3 and 4 are partial, cross-sectional views of a diaphragm piston assembly in application and release positions, respectively, showing the diaphragm modified to incorporate an annular ring in accordance with one form of the present invention.
Figure 4:
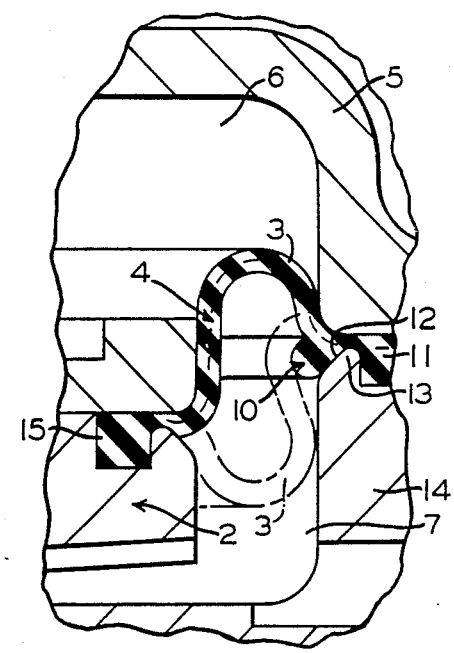

Referring now to FIG. 3, there is shown one aspect of the invention in which an annular ring 10 is formed integral with a diaphragm 4, preferably adjacent the outer periphery 11. This diaphragm is preferably a conventional, conical-type diaphragm as typically employed in ABD type control valve devices. Ring 10 protrudes from the underside of the diaphragm proper, so as to bear against the tapered surface 12 of the clamping bead 13 formed on body member 14, when the diaphragm periphery 11 is clamped between body member 14 and cover 5 and the inner periphery 15 of diaphragm 4 is clamped in piston 2. In bearing against tapered surface 12, the diaphragm ring 10 exerts an upward force on convolution 3, particularly when the convolution becomes inverted. It will be appreciated now that when service piston 2 is forced toward release position, as shown in FIG. 4, due to the differential pressure force on piston 2 acting in a downward direction by reason of brake pipe pressure in chamber 6 being greater than auxiliary reservoir pressure in chamber 7, diaphragm convolution 3 will become inverted or forced to turn inside-out, as indicated by the dashed lines in FIG. 4. In this inverted position of diaphragm convolution 3, the convolution is forced to roll over ring 10, which by reason of the severe bend thus created in the diaphragm, produces an internal stress in the diaphragm that causes an upward-acting, supplemental force to be exerted on convolution 3 to thereby encourage the diaphragm convolution to revert to its normal or preferred disposition. As the effective pressure differential forces on piston 2 equalize following movement of piston 2 to release position, the inherent force due to the diaphragm "spring effect" combines with the supplemental force exerted by ring 10 to more positively urge convolution 3 in an upward direction with sufficient force to move the convolution past an imaginary line connecting the diaphragm clamping points. When this occurs, the diaphragm convolution will snap over center by toggle action and thereby automatically revert to its normal or preferred disposition, as shown by the solid lines in FIG. 4, it being understood that in the absence of any change in the effective pressure differential between chambers 6 and 7 at this time, piston 2 remains in its release position. In comparing FIGS. 3 and 4, it will be appreciated that following its automatic reversal to an upward disposition in release position of piston 2, the desired diaphragm "spring effect" is preserved. Consequently, any tendency of diaphragm 4 to take a set in release position of piston 2 will only result in minimal, if any, loss in the inherent "spring effect" of the diaphragm over its service life.

It will now be appreciated that in more positively achieving this automatic reversal of diaphragm convolution 3 in accordance with the present invention, i.e., without requiring a differential pressure force on the diaphragm, the volumetric exchange between chambers 6 and 7, due to diaphragm displacement that occurs as a result of reversal of convolution 3, will have occurred prior to a subsequent brake application being initiated. Therefore, piston 2 is pre-conditioned to move toward application position without hesitation in response to a relatively low pressure differential thereacross, when brake pipe pressure effective in chamber 6 is reduced relative to auxiliary reservoir pressure effective in chamber 7.

Although not shown, it is also within the scope of the present invention to provide a ring 10 adjacent inner periphery 15 of diaphragm 4, so as to bear against tapered surface 16 of clamping bead 17 formed on the lower clamping member of piston 3.

Figure 5:
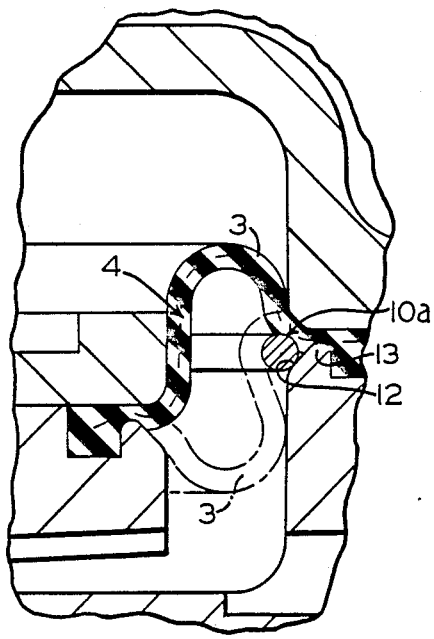
FIGS. 5 and 6 are partial, cross-sectional views of a diaphragm piston assembly in release position showing various forms of an annular ring member, according to the present invention, that is separate from the diaphragm.
Figure 6:
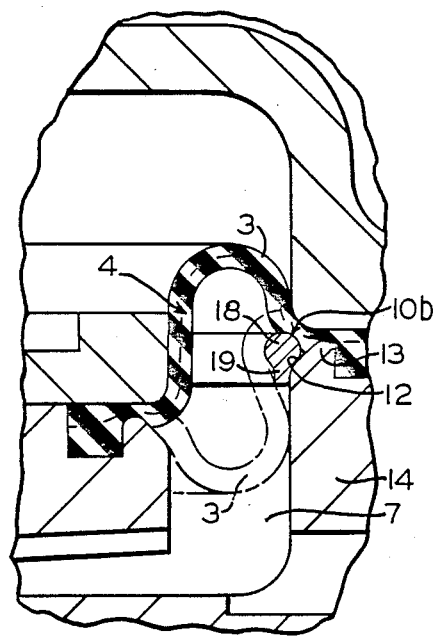
Figure 7:
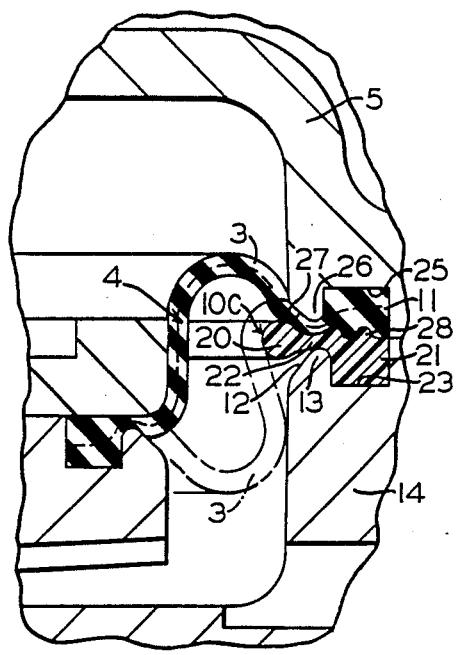
FIG. 7 is a partial, cross-sectional view of a diaphragm piston assembly in release position showing another form of an annular ring that clamps the diaphragm against a bevel surface that is formed on the upper body member to provide a further improvement of the invention.

FIGS. 5, 6, and 7 show basically similar arrangements of the invention, in which an annular ring is provided as a separate member from diaphragm 4, as opposed to being integral therewith, the annular ring in each case having a different form.

In FIG. 5, the annular ring 10a is circular in cross-section, having a slightly larger outside diameter than the outside diameter of chamber 7 formed in body 14. This provides for wedging engagement of annular ring 10a between the underside of diaphragm 1 and tapered surface 12 of clamping bead 13, such that diaphragm 1 is somewhat squeezed or compressed at the point of engagement with ring 10a. This tends to stiffen the diaphragm in a direction generally corresponding to the preferred direction of disposition of convolution 3, thereby reinforcing the internal diaphragm forces created by the bend formed when the diaphragm rolls over ring 10a in its inverted position, as discussed relative to FIGS. 3 and 4.

In FIG. 6, the annular ring 10b is formed with a head portion 18 that is circular in cross-section and a base portion 19 that is generally rectangular in cross-section and is interconnected with head portion 18 by a fillet. The outer diameter of base portion 19 corresponds to the diameter of the side wall of chamber 7 and the fillet is essentially the same radius as the radius between tapered surface 12 and the side wall of chamber 7, thereby providing a snug fit between body 14 and ring 10b to better maintain the wedged position of ring member 10b between the underside of diaphragm 1 and tapered surface 12 of clamping bead 13. Annular ring 10b is located in substantially the same position as ring 10a, and thus has the same compressive or stiffening effect necessary to enhance the diaphragm "spring effect", but has the advantage of being more stable in its position.

In FIG. 7, an annular ring 10c is provided with a generally circular head portion 20 that is connected to a base 21 by a neck portion 22. Base 21 is sized to fit within the diaphragm clamping groove 23 provided in body 14. Cover 5 is formed with a clamping groove 25 in which the diaphragm periphery 11 is retained. Cover 5 is further provided with a clamping bead 26 and tapered surface 27 similar to clamping bead 13 and tapered surface 12 of body 14. The contour of the upper surface of head portion 20 and neck portion 22 that is engageable with diaphragm 1 corresponds generally to the contour of tapered surface 27 of cover 24 and is generally parallel thereto. In that this tapered surface 27 is directed upwardly from clamping bead 26, it will be appreciated that when cover 24 is clamped in place on body 14, diaphragm 4 is compressed against tapered surface 27 by ring 10c to thereby stiffen the diaphragm generally in the preferred direction of disposition of convolution 3. This reinforces the tension created in the diaphragm, due to the bend in the diaphragm as it rolls over ring 10c, thereby further encouraging the diaphragm convolution to revert to its normal or preferred disposition. One or more serrations or beads 28 may be provided on the top surface of base 21 to aid in clamping the diaphragm periphery 11 in place.

In the above-discussed embodiments of FIGS. 3–7, the diaphragm clamping arrangement and location of the annular ring member is such that the ring projects into the diaphragm cavity, effectively shortening the distance between the diaphragm clamping points. Since the force required to snap or toggle diaphragm convolution 3 over center increases as the distance between diaphragm clamping points decreases, increasing the distance between clamping points is desirable from the standpoint of reducing the internal diaphragm force required to toggle the diaphragm convolution from an inverted condition to its preferred disposition.

Figure 8:
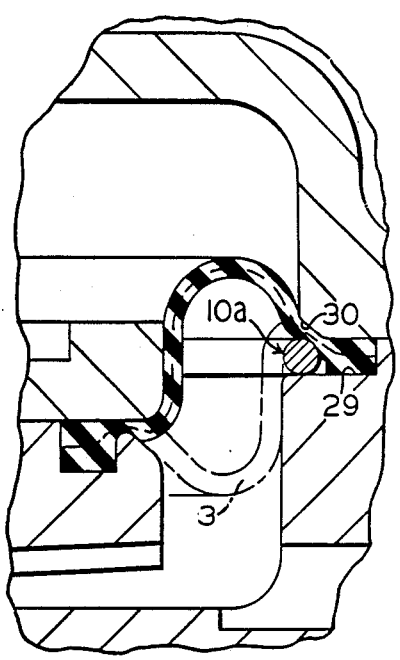
FIG. 8 is a partial, cross-sectional view of a diaphragm piston assembly in release position showing a form of the invention in which the diaphragm is clamped against a bevel surface of the upper body member, according to FIG. 7, and further modified by recessing the annular ring member out of the diaphragm cavity.

This feature is addressed in FIGS. 8, 9, 10, and 11. As shown in FIG. 8, maximum benefit afforded by the invention is achieved by increasing the diameter of chamber 6 in cover 5 relative to the diameter of chamber 7 in body 14 and forming a recess 29 in body 14 by eliminating the usual diaphragm clamping bead. Cover 5 is also formed with a tapered surface 30 against which an annular ring 10a, similar to ring 10a of FIG. 5, clamps diaphragm 1 in position. Such an arrangement provides for maximizing the dimension between the diaphragm clamping points and, consequently, minimizes the differential pressure force required to toggle diaphragm convolution 3 over center, thereby enhancing the automatic reversal of the diaphragm convolution from an inverted condition to its normal or preferred disposition, due to the diaphragm "spring effect" afforded by the addition ring 10a. Of course, any of the other rings 10b and 10c are also applicable in this aspect of the invention. Moreover, increasing the diameter of chamber 6 has the further advantage of increasing the area of diaphragm convolution 3 that is subject to the differential pressure effective between chambers 6 and 7, thereby increasing the upward force acting on diaphragm convolution 3 and on piston 2, when the brake pipe pressure effective in chamber 6 is reduced relative to auxiliary reservoir pressure effective in chamber 7. In this respect, piston 2 is pre-conditioned to move from its release position to application position in response to a relatively low pressure differential thereacross when a brake application is initiated. When combining this aspect of the invention with that aspect of the invention dealing with improving the ability of the diaphragm convolution to reverse itself, it will be appreciated that any hesitation heretofore attributed to movement of piston 2 from release to application position is overcome.

Figure 9:
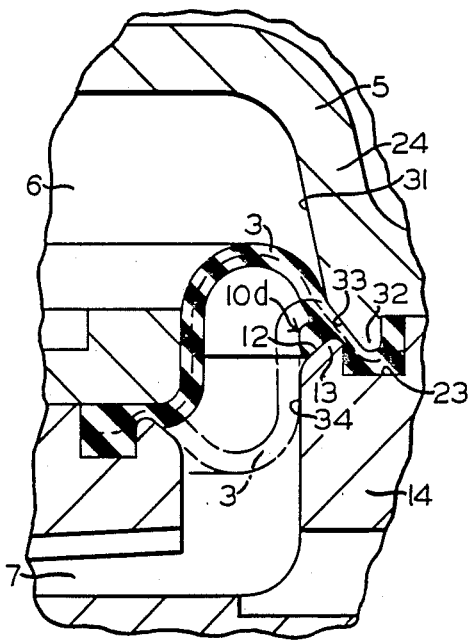
FIGS. 9 and 10 are partial, cross-sectional views of a diaphragm piston assembly in release position showing the form of the invention, according to FIG. 8, achieved without changing the standard ABD service portion body.
Figure 10:
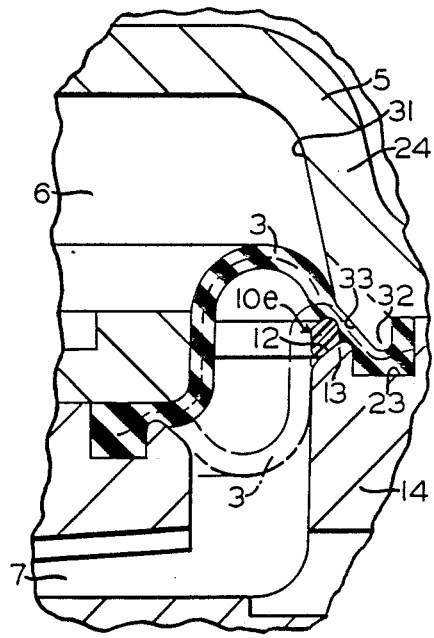
Figure 11:
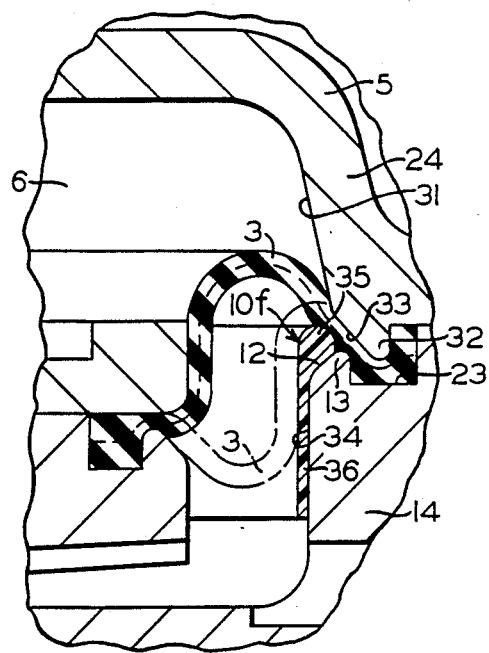
FIG. 11 is a partial, cross-sectional view of a diaphragm piston assembly in release position similar to FIG. 10, but having a different form of clamping ring.

This latter aspect of the invention is carried over in the arrangements shown in FIGS. 9, 10, and 11. The significant difference from FIG. 8 being that the clamping point is achieved by increasing the diameter of chamber 6 by tapering the side wall 31 of chamber 6 and forming a clamping bead 32 and a tapered surface 33 of the clamping bead on cover 24. This arrangement permits a conventional body 14 to be employed having a conventional clamping bead 13, tapered surface 12, and clamping groove 23. In FIG. 9, a ring member 10d, integral with diaphragm 1, is employed similar to ring 10 of FIGS. 3 and 4, except that its face is cut off flush with side wall 34 of chamber 7 in body 14. This, accompanied by the fact that ring 10d is recessed beyond side wall 34, provides a smooth contour along which the diaphragm convolution lies in its inverted condition, as shown in dashed lines. In that the clamping point is also recessed beyond side wall 34 of chamber 7, the toggle action of diaphragm convolution 3 is optimized, as explained relative to FIG. 8. Moreover, the diaphragm clamping is achieved by reason of bead 13 being located adjacent tapered surface 33, so that the diaphragm convolution is directed by the clamping force between bead 13 and tapered surface 33 to assume an upward disposition. In bending around ring 10d, in the inverted configuration of convolution 3, diaphragm 4 is stressed to provide an internal diaphragm force that encourages the diaphragm convolution to revert to its normal preferred disposition. The clamping bead 32, formed on cover 24, lies adjacent groove 23 to clamp the diaphragm periphery against pull-out.

In FIG. 10, the arrangement conforms generally to that of FIG. 9, except that an annular ring 10e is employed that is similar in shape to ring 10d, but is separate from diaphragm 1.

In FIG. 11, the arrangement is generally similar to that of FIG. 10, except that an annular ring 10f is employed that combines the features of the rings shown in FIGS. 6 and 10. In this sense, ring 10f is separate from diaphragm 1, having a head portion 35 similar in shape to ring 10e in FIG. 10 and an elongated base 36 similar to base portion 19 of ring 10b in FIG. 6. In that the head of ring 10f is recessed beyond the side wall 34 of chamber 7, its connection with the base portion is offset and thereby provides for a smooth fold of the diaphragm convolution when inverted, as shown in dashed lines. The outer diameter of base portion 36 corresponds to the diameter of side wall 34, and the fillet between the head and base portions is essentially the same radius as the radius between the tapered surface 12 of clamping bead 13 and side wall 34. Thus, the outer periphery of annular ring 10f has a snug fit with body 14 to positively maintain the degree of wedging and thus compression of diaphragm 4 by ring 10e.

Figure 1:
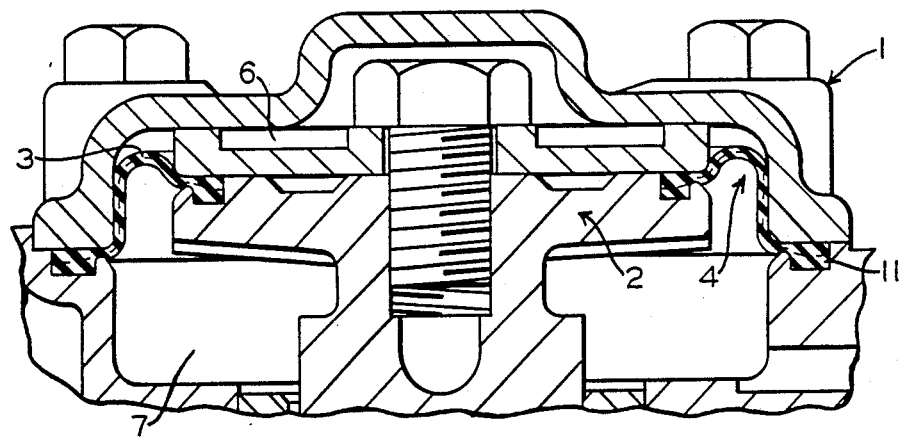
FIGS. 1 and 2 are partial, cross-sectional views of a conventional diaphragm piston assembly, as employed in an ABD type control valve service portion, in which the piston is shown in application and release positions, respectively.
Figure 2:
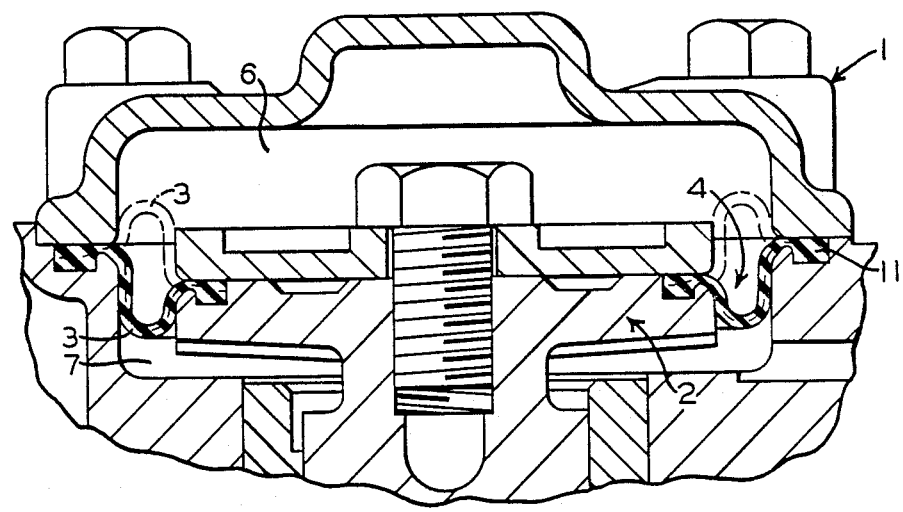

From the foregoing discussion relative to the various embodiments of the invention, it will now be appreciated that by the addition of ring member 10, diaphragm 4 is forced to take a sharper bend at its clamping point in body 14 when in its inverted condition, as compared to the more shallow bend noted in the prior art arrangement of FIG. 2. In FIG. 2, for example, the diaphragm bend between outer periphery 11 and convolution 3 in the inverted condition of diaphragm 4 is no greater than 90°, whereas in the embodiments of the invention, the corresponding diaphragm bend, due to ring 10, is clearly greater than 90°, thereby providing greater tension in the diaphragm to encourage the diaphragm convolution to revert to its preferred disposition.

I claim:

1. A diaphragm piston assembly comprising:
   (a) an annular diaphragm having an inner periphery and an outer periphery;
   (b) a piston in which said inner periphery of said diaphragm is clamped;
   (c) a housing having clamping faces between which said outer periphery of said diaphragm is clamped, said piston being movable relative to said housing;
   (d) a first fluid pressure chamber on one side of said piston and a second fluid pressure chamber on the opposite side of said piston;
   (e) said diaphragm having a convolution in the space between said piston and said housing, said convolution having a preferred direction of formation and a non-preferred direction of formation in which said convolution is inverted from said preferred direction of formation; and
   (f) annular ring means interposed between one side of said diaphragm and one of said housing and said piston for directing said diaphragm in said preferred direction of formation at a location between said outer periphery and said convolution, and for forming a bend in said diaphragm at said location between said outer periphery and said convolution when said convolution is inverted to said non-preferred direction of formation to thereby create such internal diaphragm stress as to urge said convolution to revert to said preferred direction of formation.

2. A diaphragm piston assembly, as recited in claim 1, wherein said annular ring means is an annular ring formed integral with said diaphragm.

3. A diaphragm piston assembly, as recited in claim 1, wherein said annular ring means is an annular ring member separate from said diaphragm.

4. A diaphragm piston assembly, as recited in claim 3, wherein said housing comprises:
   (a) a body portion in which said second fluid pressure chamber is formed including:
      (i) a clamping bead; and
      (ii) a tapered surface of said clamping bead intersecting with the side wall of said second fluid pressure chamber; and
   (b) a cover portion in which said first fluid pressure chamber is formed, said cover portion pressing said diaphragm against said clamping bead to provide said clamping of said outer periphery of said diaphragm.

5. A diaphragm piston assembly, as recited in claim 4, wherein said annular ring member is a annular ring that is generally circular in cross-section, and at least a portion of which protrudes into the space between said piston and said housing to support said diaphragm at said location between said outer periphery and said convolution when said convolution is inverted from said preferred direction of formation.

6. A diaphragm piston assembly, as recited in claim 4, wherein said annular ring member comprises:
   (a) a head portion that is generally circular in cross-section; and
   (b) a base portion that is generally rectangular in cross-section and is interconnected with said head portion such that at least a portion of the outside contour of said annular ring corresponds to the contour of said tapered surface and side wall of said second chamber, and has engagement therewith, at least a portion of said head portion protruding into the space between said piston and said housing to form said bend in said diaphragm between said outer periphery and said convolution when said convolution is inverted from said preferred direction of formation, the degree of said bend determining said internal diaphragm force.

7. A diaphragm piston assembly, as recited in claim 3, wherein said housing comprises:
   (a) a body portion in which said second fluid pressure chamber is formed including:
      (i) a first clamping bead;
      (ii) a first tapered surface of said first clamping bead intersecting with the side wall of said second fluid pressure chamber; and
      (iii) a first clamping groove adjacent said first clamping bead on the side opposite said first tapered surface; and
   (b) a cover portion in which said first fluid pressure chamber is formed including:
      (i) a second clamping bead aligned opposite said first clamping groove;
      (ii) a second tapered surface of said second clamping bead intersecting with the side wall of said first fluid pressure chamber, said first and second tapered surfaces being angled in opposite directions; and
      (iii) a second clamping groove adjacent said second clamping bead on the side thereof opposite said second tapered surface.

8. A diaphragm piston assembly, as recited in claim 7, wherein said annular ring member comprises:
   (a) a head portion that is generally circular in cross-section; and
   (b) a base portion having a shape corresponding to said first clamping groove and disposed therein;
   (c) a neck portion interconnecting said head portion and said base portion, said neck portion lying intermediate said oppositely aligned first and second clamping beads, said outer periphery of said diaphragm being clamped in said housing between said annular ring and said second clamping bead and second tapered surface to urge said diaphragm in said preferred direction of formation.

9. A diaphragm piston assembly, as recited in claim 8, wherein the cross-sectional diameter of said head portion is greater than the cross-sectional diameter of said neck portion so as to form a surface of said annular ring member adjacent said second tapered surface having a contour corresponding generally to the contour of said second tapered surface, said clamping of the outer periphery of said diaphragm being between said contour surface of said annular ring member and said second tapered surface.

10. A diaphragm piston assembly, as recited in claim 9, wherein said second tapered surface is formed at an angle with the clamping faces of said housing, said head portion protruding into the space between said piston and said housing to form said bend in said diaphragm between said outer periphery and said convolution when said convolution is inverted from said preferred direction of formation, the degree of said bend determining said internal diaphragm force.

11. A diaphragm piston assembly, as recited in claim 9, wherein said base portion is formed with at least one serration projecting into said second clamping groove.

12. A diaphragm piston assembly, as recited in claim 3, wherein said housing comprises:
   (a) a body portion in which said second fluid pressure chamber is formed, said body portion having an annular recess in the face thereof, said recess extending to the side wall of said second chamber; and
   (b) a cover portion in which said first fluid pressure chamber is formed, said first chamber having a side wall terminating in a bevel surface that overlies said annular recess, said bevel surface being formed at an angle with the clamping faces of said housing.

13. A diaphragm piston assembly, as recited in claim 12, wherein said annular ring member is disposed between one side of said diaphragm and said annular recess to provide said clamping of said outer diaphragm periphery against said bevel surface to encourage said diaphragm convolution to form in said preferred direction of formation, said annular ring member causing said diaphragm to form said bend intermediate said outer periphery and said convolution thereof when said convolution is inverted from said preferred direction of formation, the degree of said bend determining said internal diaphragm force.

14. A diaphragm piston assembly, as recited in claim 13, wherein said annular ring member is circular in cross-section, the diameter of said circular cross-section thereof being such as to wedge said diaphragm into engagement with said bevel surface under compression.

15. A diaphragm piston assembly, as recited in claim 13, wherein the inside diameter of said annular ring member is at least as great as the diameter of said second fluid pressure chamber, so as to be entirely within said annular recess.

16. A diaphragm piston assembly, as recited in claim 13, wherein the diameter of said first fluid pressure chamber is greater than the diameter of said second fluid pressure chamber.

17. A diaphragm piston assembly, as recited in claim 1, wherein said housing comprises:
   (a) a body portion in which said second fluid pressure chamber is formed including:
      (i) a first clamping bead;
      (ii) a first tapered surface of said first clamping bead on one side thereof intersecting with the side wall of said second fluid pressure chamber; and
      (iii) an annular clamping groove formed on the other side of said clamping bead; and
   (b) a cover portion in which said first fluid pressure chamber is formed including:
      (i) a second clamping bead aligned opposite said annular clamping groove of said body portion; and
      (ii) a second tapered surface of said second clamping bead on one side thereof intersecting with the side wall of said first chamber, said second tapered surface being formed at an angle with the clamping faces of said housing, said first tapered surface and said other side of said first clamping bead intersecting on a line perpendicular to said second tapered surface.

18. A diaphragm piston assembly, as recited in claim 17, wherein said clamping of the outer periphery of said diaphragm is between said first clamping bead an said second tapered surface to encourage said diaphragm convolution to form in said preferred direction.

19. A diaphragm piston assembly, as recited in claim 18, wherein said first and second tapered surfaces are tapered in opposite directions.

20. A diaphragm piston assembly, as recited in claim 19, wherein the inside diameter of said annular ring means is at least as great as the diameter of said second fluid pressure chamber.

21. A diaphragm piston assembly, as recited in claim 20, wherein the diameter of said first fluid pressure chamber is greater than the diameter of said second fluid pressure chamber.

22. A diaphragm piston assembly, as recited in claim 21, wherein said annular ring means is an annular ring formed integral with said diaphragm.

23. A diaphragm piston assembly, as recited in claim 22, wherein said annular ring is formed with a first surface conforming generally with said first tapered surface and bearing thereon under compression, said annular ring causing said diaphragm to form said bend intermediate said outer periphery and said convolution thereof when said convolution is inverted from said preferred direction of formation, the degree of said bend determining said internal diaphragm force.

24. A diaphragm piston assembly, as recited in claim 23, wherein said annular ring is formed with a second surface parallel to said side wall of said second chamber and lying substantially in line therewith.

25. A diaphragm piston assembly, as recited in claim 21, wherein said annular ring means is an annular ring member separate from said diaphragm.

26. A diaphragm piston assembly, as recited in claim 25, wherein said annular ring member is formed with a flat surface conforming generally with said first tapered surface and bearing thereon, said annular ring member causing said diaphragm to form said bend intermediate said outer periphery and said convolution thereof when said convolution is inverted from said preferred direction, the degree of said bend determining said internal diaphragm force.

27. A diaphragm piston assembly, as recited in claim 26, wherein said annular ring is formed with a second surface parallel to said side wall of said second chamber and lying substantially in line therewith.

28. A diaphragm piston assembly, as recited in claim 25, wherein said annular ring member comprises:
   (a) a head portion engageable with said first tapered surface; and
   (b) a base portion depending from said head portion and having one surface engageable with the side wall of said second chamber, whereby said head portion is located relative to said second tapered surface such as to urge said diaphragm into engagement therewith.

29. A diaphragm piston assembly, as recited in claim 28, further characterized in that said head portion is generally circular in cross-section and said base portion is generally rectangular in cross-section, the surface of said base portion opposite said one surface thereof being tangent with said head portion.

30. A diaphragm piston assembly, as recited in claim 29, wherein the angle of said second tapered surface is such as to cause said diaphragm to form said bend around said head portion intermediate said outer periphery and said convolution when said diaphragm convolution is inverted from said preferred direction, the degree of said bend determining said internal diaphragm force.

31. A diaphragm piston assembly, as recited in claim 17, wherein said annular ring means is an annular ring member separate from said diaphragm.

* * * * *